(12) United States Patent
Ozeki et al.

(10) Patent No.: US 7,272,970 B2
(45) Date of Patent: Sep. 25, 2007

(54) SPARK PLUG HAVING COMBUSTION PRESSURE DETECTING FUNCTION

(75) Inventors: Keiji Ozeki, Konan (JP); Koji Okazaki, Ichinomiya (JP)

(73) Assignee: NGK Spark Plug Co., Ltd., Tokyo (JP)

( * ) Notice: Subject to any disclaimer, the term of this patent is extended or adjusted under 35 U.S.C. 154(b) by 0 days.

(21) Appl. No.: 11/392,622

(22) Filed: Mar. 30, 2006

(65) Prior Publication Data

US 2006/0284535 A1 Dec. 21, 2006

(30) Foreign Application Priority Data

Mar. 31, 2005 (JP) ............ P.2005-104737

(51) Int. Cl.
*G01L 23/22* (2006.01)
(52) U.S. Cl. ................................. 73/35.12
(58) Field of Classification Search ........... 73/35.01, 73/35.07, 35.12, 35.13, 115, 116, 117.2, 117.3, 73/118.1

See application file for complete search history.

(56) References Cited

U.S. PATENT DOCUMENTS

| | | | |
|---|---|---|---|
| 4,357,825 A * | 11/1982 | Yamaguchi et al. ....... 73/35.09 |
| 4,686,861 A | 8/1987 | Morii | |
| 4,881,403 A | 11/1989 | Kagawa et al. | |
| 4,909,071 A | 3/1990 | Amano et al. | |
| 4,996,873 A * | 3/1991 | Takeuchi ............ 73/115 |
| 5,101,659 A * | 4/1992 | Takeuchi ............ 73/115 |
| 5,313,849 A * | 5/1994 | Miyata et al. ......... 73/866.5 |
| 5,323,643 A | 6/1994 | Kojima et al. | |
| 5,479,817 A | 1/1996 | Suzuki et al. | |
| 5,747,677 A * | 5/1998 | Tomisawa et al. ....... 73/115 |
| 6,411,038 B2 * | 6/2002 | Murai et al. .......... 315/55 |
| 6,843,111 B2 * | 1/2005 | Meyer et al. .......... 73/116 |
| 2001/0015402 A1* | 8/2001 | Murai et al. .......... 248/554 |
| 2003/0074972 A1* | 4/2003 | Meyer et al. .......... 73/753 |

FOREIGN PATENT DOCUMENTS

| JP | 61-57830 | 4/1986 |
|---|---|---|
| JP | 2002-243569 | 8/2002 |

* cited by examiner

*Primary Examiner*—Eric S. McCall
(74) *Attorney, Agent, or Firm*—Sughrue Mion Pllc.

(57) ABSTRACT

A spark plug having a combustion pressure detecting function, including a tip end portion in an axial direction of the spark plug capable of generating a spark discharge, a male thread adapted for attaching the spark plug to an internal combustion engine and a metal shell including, at a rear end side of the male thread, a brim portion projecting perpendicularly to the axial direction; an annular, flat gasket provided on a tip side of the brim portion; and a pressure sensor including a pressure-sensitive element, wherein the gasket has a Young's modulus E ($kN/mm^2$) satisfying a relationship, $100 \leq E \leq 170$.

11 Claims, 7 Drawing Sheets

SPARK PLUG HAVING COMBUSTION PRESSURE DETECTING FUNCTION

BACKGROUND OF THE INVENTION

1. Field of the Invention

The present invention relates to a spark plug having a combustion pressure detecting function in which an annular pressure sensor for measuring the combustion pressure of an internal combustion engine is tightly fastened together with a gasket when attaching the spark plug.

2. Description of the Related Art

A spark plug equipped with a pressure detecting device (pressure sensor) incorporating a piezoelectric element, proposed in JP-UM-A-61-57830, is among known spark plugs having a combustion pressure detecting function.

The pressure detecting device is fitted so as to contact the seat surface of a brim portion formed behind the rear end of a male thread of the metal shell of the spark plug, and is attached to an internal combustion engine (cylinder head) together with the spark plug. To prevent gas leakage while running the internal combustion engine, the pressure detecting device is attached such that an annular, flat gasket made from copper or a copper-based alloy is disposed between the seat surface of the metal shell and the pressure detecting device. The piezoelectric element in the pressure detecting device is preloaded (i.e., subjected to an applied pressure) when a fastening torque is applied in attaching the spark plug (JP-A-2002-243569).

The pressure detecting device operates in the following manner. When an air-fuel mixed gas explodes in the combustion chamber of an internal combustion engine, the internal pressure of the combustion chamber increases. As a result, the spark plug that is attached to the cylinder head is slightly displaced in an axial direction. The preload pressure on the piezoelectric element is varied by displacement of the spark plug, and the resulting change is detected as a sensor output.

3. Problems to be Solved by the Invention

JP-UM-A-61-57830 discloses that the annular, flat gasket made of the above-mentioned material is an improvement over a previous S-shaped or U-shaped gasket made of iron from which a prescribed output cannot be obtained and which varies to a large extent with respect to the fastening torque. Although JP-A-2002-243569 suggests the use of a gasket made of a copper alloy, it does not disclose the characteristics required of a gasket or means for attaining such characteristics.

In recent years, combustion pressure has increased as engine output power has increased, and a highly accurate sensor output is required for engine control based on combustion pressure. For use in such engines, gaskets made of the above-mentioned conventional materials may not be able to provide as high a sealing performance, anti-loosening performance, etc., as needed. If the gasket is loosened or if gas leakage occurs, the displacement caused by the combustion pressure becomes very small. As a result, the sensor output becomes small and hence the combustion pressure or the combustion state cannot be detected accurately. In addition, gas leakage lowers the output power and fuel efficiency of the engine.

After conducting diligent studies, the present inventors found that a gasket having a large spring constant, a large true contact area, a small gasket displacement and good stress relaxation characteristics (i.e., a small stress relaxation factor) are important for attaining the requisite performance.

SUMMARY OF THE INVENTION

The present invention has been made in view of the above circumstances. Accordingly, an object of the invention is to provide a spark plug having a combustion pressure detecting function and which includes a gasket capable of restraining loss in sensor output, which maintains high airtightness, and which is resistant to loosening.

The above object has been achieved by providing a spark plug having a combustion pressure detecting function, which comprises: a tip end portion in an axial direction of the spark plug capable of generating a spark discharge, a male thread adapted for attaching the spark plug to an internal combustion engine and a metal shell including, at a rear end side of the male thread, a brim portion projecting perpendicularly to the axial direction; an annular, flat gasket disposed on a tip side of the brim portion; and a pressure sensor including a pressure-sensitive element, wherein the gasket has a Young's modulus E ($kN/mm^2$) satisfying a relationship $100 \leq E \leq 170$.

If the Young's modulus of the material of the gasket is larger than or equal to 100 $kN/mm^2$, a state in which the gasket is not prone to elastic deformation and is mechanically rigid can be maintained. On the other hand, if the Young's modulus is smaller than 100 $kN/mm^2$, a combustion pressure transmitted through the spark plug is absorbed by the gasket, and hence a variation in combustion pressure cannot be transmitted to the pressure sensor in a linear manner. As a result, the sensor output decreases (i.e., the loss increases) and the S/N ratio (signal-to-noise ratio) also decreases. On the other hand, if the Young's modulus exceeds 170 $kN/mm^2$, the gasket is hard and difficult to deform elastically when the spark plug is fastened tight. As a result, the combustion chamber is not kept airtight, that is, combustion gas can leak out of the combustion chamber. When the spark plug is displaced in the axial direction by a combustion pressure, a very small gap is formed between the seat face of the metal shell and the gasket. Combustion gas then leaks through the gap, which interferes with generation of a normal sensor output.

In general, the Young's modulus and spring constant of a material are in a proportional relationship. When the gasket is deformed elastically (deformation length: x) by force F (hereinafter also referred to as "axial force") produced by fastening of the spark plug or a combustion pressure, their relationship can be considered the same as the relationship between the force and the deformation length x of a spring having a spring constant k (see Equation 1 below). When the axial force acting on the gasket is constant, the deformation length x decreases as the spring constant k increases. If the deformation length x is short, the gasket is not unduly deformed in transmitting a combustion pressure to the pressure sensor and hence the S/N ratio is increased. On the other hand, if the spring constant is too large, the deformation length x itself is small, but the gasket cannot maintain the combustion chamber sufficiently airtight. Consequently, combustion gas leaks, and combustion pressure cannot properly be transmitted to the pressure sensor.

$$F = kx \qquad \text{Equation 1}$$

The 0.2% yield strength, which is defined in JIS G0202:1987 and JIS Z2241:1998, of the gasket is desirably 250 $N/mm^2$ or less. Also, the gasket of the spark plug desirably has a combustion pressure detecting function able to reliably transmit a combustion pressure to the pressure sensor as well as a sealing function of suppressing leakage of a combustion gas which is the original function of the gasket. The true contact area of the gasket (see Equation 2 below) is an important parameter with respect to leakage of a combustion gas. The true contact area is the pressure acting on the surfaces concerned (i.e., the top and bottom surfaces of the gasket in which the vertical direction is the axial direction of the spark plug) divided by the 0.2% yield strength. If the true contact area is large, that is, if the 0.2% yield strength is 250 N/mm² or less, good sealing performance capable of decreasing the leakage rate of a combustion gas can be obtained. On the other hand, if the 0.2% yield strength is less than 10 N/mm², the gasket is soft and exhibits good sealing performance. However, the output of the pressure sensor is distorted and hence is not satisfactory. If the 0.2% yield strength is greater than 250 N/mm², in order to increase the true contact area the pressure acting on the surfaces, an unduly high torque must be produced in fastening the spark plug to the engine, namely, a torque that is higher than the value prescribed for each type of spark plug (e.g., 27.5 N·m for a spark plug having a metal shell whose nominal designation is M14 and 17.5 N·m for a spark plug having a metal shell whose nominal designation is M12). In this case, the spark plug is susceptible to breakage.

(True contact area)=(pressure acting on surface)/
(0.2% yield strength of surface)             Equation 2

The gasket desirably has a surface roughness Ry, which is defined by JIS B 0601:2001, of 3.2S or less. As described above, one role of the gasket is to prevent combustion gas from leaking out of the combustion chamber. The gasket that is used together with the above-described pressure sensor must also be able to accurately transmit a load variation (due to a variation in combustion pressure) to the pressure sensor. In connection with these roles, if the surface roughness value of the gasket is too large, the airtightness is lowered and hence the pressure in the combustion chamber decreases. A load variation is not transmitted linearly to the pressure sensor, which lowers the accuracy of the sensor output. To solve this problem, according to the invention, the surface roughness of the gasket is made 3.2S or less.

The gasket desirably has a Vickers hardness Hv, which is defined in JIS Z 2244:2003, of 60 to 90. For the gasket to effectively attain the above effects, the gasket surface is desirably smooth, that is, has a low surface roughness. One measure for realizing a gasket having smooth surfaces is to set the Vickers hardness in the range of 60 to 90. If the Vickers hardness Hv is greater than 90, the gasket cannot be deformed sufficiently when the spark plug is attached to the engine with a prescribed torque. As a result, airtightness may be lowered because of a reduction in the closeness of contact between the contact surfaces of the gasket and the brim portion of the spark plug and the engine head. On the other hand, when the Vickers hardness Hv is equal to 60, the present inventors found a slight reduction in sensor output although it was usable. Therefore, a Vickers hardness Hv of less than 60 is not preferred. This is because the sensor detection accuracy may be lowered to such an extent as to cause a problem. When the Vickers hardness Hv is equal to 70, no such reduction in sensor output was found. Therefore, the Vickers hardness Hv is further preferably in the range of 70 to 90.

On the other hand, conventional gaskets made of a copper-based alloy such as brass have a poor creep resistance. Creep deformation may occur due to repetitive heating and cooling associated with repetitive engine driving and halting. As a result, the axial force for fixing the spark plug to the engine is lowered, whereby screw loosening may result by vibration of the engine during operation. Gaskets made of phosphor bronze, for example, have a higher initial creep resistance than gaskets made of brass. However, as gaskets made of phosphor bronze are used repetitively over a long period of time, the stress relaxation factor decreases to a level equivalent to that of gaskets made of brass to possibly cause screw loosening.

To solve the above problem, a copper alloy containing Ni in an amount of 0.80 to 1.20 wt %, Sn in an amount of 0.50 to 1.10 wt %, P in an amount of 0.03 to 0.07 wt %, and Cu in an amount of 97.63 to 98.67 wt % is employed as a gasket material. Superior creep resistance can be attained by a copper-based alloy having an Ni content of 0.80 to 1.20 wt %. This increase in creep resistance is considered due to the presence, as very small deposits, of the Ni component in the Cu structure. On the other hand, if the Ni content is lower than 0.80 wt %, the stress relaxation factor is small and hence creep deformation is prone to occur. If the Ni content is higher than 1.20 wt %, large Ni deposits are formed and hence the properties of Ni become more influential. In that case, the stress relaxation characteristic cannot be improved and hence high creep resistance cannot be obtained. Adjusting the gasket material to contain Sn in an amount of 0.50 to 1.10 wt % and P in an amount of 0.03 to 0.07 wt % increases the hardness of the alloy to realize high ductility. As a result, a gasket can be obtained which can increase the sensor output and enhance the sealing performance.

DESCRIPTION OF REFERENCE NUMERALS

Figure 1:
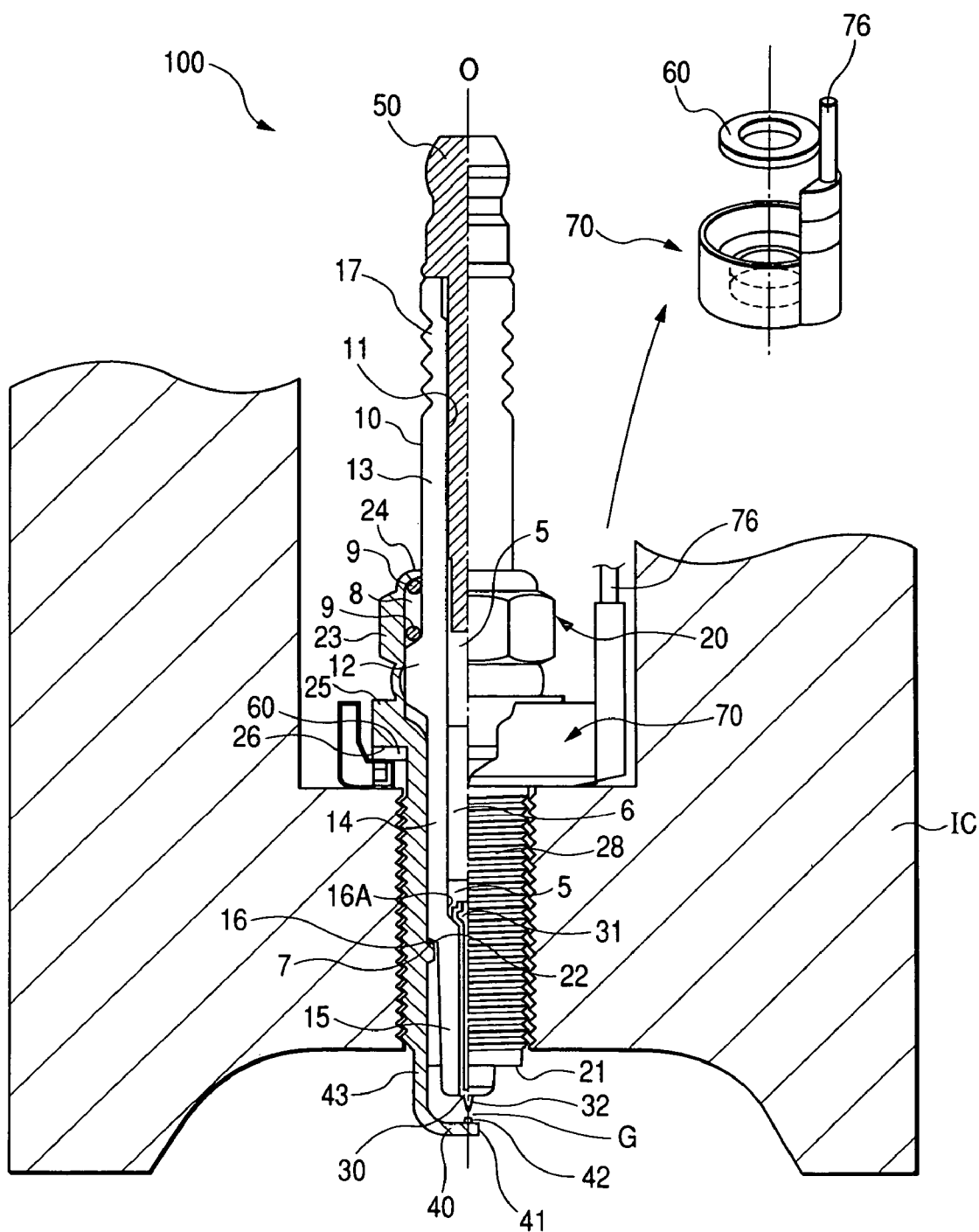
FIG. 1 is a partial sectional view showing an entire spark plug having a combustion pressure detecting function according to the present invention including a gasket, the spark plug being attached to an internal combustion engine.

Reference numerals used to identify various structural features in the drawings include the following.

10: Insulator

20: Metal shell

25: Brim portion

26: Seat face

30: Center electrode

40: Ground electrode

60: Gasket

70: Pressure sensor

71: Case member

72: Piezoelectric element

73: Electrode plate

74: Insulating plate

75: Annular seat

76: Insulating tube

77: Output lead wire

100: Spark plug

DETAILED DESCRIPTION OF THE INVENTION

A spark plug having a combustion pressure detecting function according to an embodiment of the present invention will be hereinafter described with reference to the drawings. However, the present invention should not be construed as being limited thereto.

FIG. 1 is a partial sectional view of a spark plug having a combustion pressure detecting function attached to an internal combustion engine. As shown in its overall view of FIG. 1, the spark plug 100 includes an insulator 10, a metal shell 20 surrounding insulator 10 so as to extend approximately from the center toward the tip of the insulator 10 in its longitudinal direction and which holds the insulator 10, a center electrode 30 which is held inside the insulator 10, a ground electrode 40 joined to the metal shell 20, a terminal metal part 50 disposed at the rear end of the insulator 10, a gasket 60, and a pressure sensor 70.

First, the insulator 10 will be described. The insulator 10 has an internal axial hole 11 which extends in the longitudinal direction, that is, along an axial line O. As is well known, the insulator 10 is formed by firing alumina or the like so as to assume a generally cylindrical shape. A projection 12 is formed approximately at the center in the axial line O direction so as to project outward in a radial direction. A tail-side barrel portion 13 is formed in the rear of the projection 12. On the other hand, a tip-side barrel portion 14 which is smaller in diameter than the tail-side barrel portion 13 is formed on the tip side of the projection 12, and a leg portion 15 which is smaller in diameter than the tip-side barrel portion 14 and tapers down toward the tip is formed on the tip side of the tip-side barrel portion 14. A step portion 16 is formed between the leg portion 15 and the tip-side barrel portion 14. To increase the creepage distance between the terminal metal part 50 and the metal shell 20, the tail-side barrel portion 13 is formed with a corrugation 17 at a position close to its rear end (its top as viewed in FIG. 1).

The axial hole 11 of the insulator 10 is formed with a step portion 16A immediately on the tip side of the tip-side barrel portion 14, and the step portion 16A has surface that engages the center electrode 30. A rear end portion of the center electrode 30 projects in the radial direction so as to engage step portion 16A The center electrode 20 is formed by working a member made of a nickel alloy such as INCONEL 600 (trade name) into a rod shape. To increase its heat conductivity, a member 31 made of a copper-based alloy is inserted in the center electrode 20. To increase wear resistance, a wear resistance enhancing member 32 made of a noble metal such as platinum or iridium, an alloy of those metals, or a base metal such as a tungsten alloy is joined to the tip of the center electrode 20. On the other hand, the rear end of the center electrode 20 is electrically connected to the terminal metal part 50 via a glass sealing body 5 and a resistor 6. A high-voltage cable (not shown) is connected to the terminal metal part 50 via a plug cap, whereby a high voltage is applied to the terminal metal part 50.

Like the center electrode 30, the ground electrode 40, which forms a spark discharge gap G with the center electrode 30, is made of a nickel alloy or the like. The ground electrode 40 has an approximately rectangular transverse cross section, and its tip portion 41 may be provided with a wear resistance enhancing member (noble metal firing tip) 42. On the other hand, a rear end face 43 of the rear end portion of the ground electrode 30 is joined to a tip face 21 of the metal shell 20 by resistance welding, for example.

The metal shell 20 is generally cylindrical and is made of an iron-based material. The inner circumferential surface of the metal shell 20 holds the outer circumferential surface of the insulator 10. More specifically, the inner circumferential surface of the metal shell 20 is formed with a step portion 22, and the step portion 16 of the insulator 10 is in contact with the step portion 22. A metal plate packing 7 may be interposed between the step portions 16 and 22. An internal hole extends from the step 22 toward the rear end so as to have approximately the same diameter as the outer diameter of the tip-side barrel portion 14 of the insulator 10. To accommodate the projection 12, that portion of the internal hole which is close to the rear end is increased in diameter. The outer circumferential surface of the projection-12-accommodated portion of the metal shell 20 is formed with a tool engagement portion 23 having a polygonal (e.g., hexagonal) cross section for attaching the spark plug 100. A crimping lip 24 which is part of the metal shell 20 is formed in the rear of the tool engagement portion 23 so as to be bent (crimped) inward in the radial direction, and is thereby fixed to the metal shell 20 so as to form an integral member. To prevent leakage of combustion gas from the combustion chamber and increase airtightness, talc 8 and annular packings 9 may be inserted under crimping lip 24. A brim portion 25 is formed on the tip side of the tool engagement portion 23 so as to cover the entire circumference and to project outward in a radial direction. When the spark plug 100 is attached to an internal combustion engine IC, a seat face 26 as a tip face of the brim portion 25 serves as a face opposed to the outer surface of the internal combustion engine IC. To attach the spark plug 100 to the internal combustion engine IC, a male thread 28 is inserted into the gasket 60 and the pressure sensor 70 and rotated using the tool engagement portion 23, whereby the male thread 28 is fastened tight to a female thread of a plug hole of the internal combustion engine.

The gasket 60, which is used in attaching the spark plug 100 to the internal combustion engine IC, is manufactured in the following manner.

A copper-based alloy containing Ni (1.00 wt %), Sn (0.90 wt %), and P (0.05 wt %) as essential components and containing Cu (in balance) is worked into a 1.5-mm-thick plate. The plate is punched to produce plate pieces having a gasket outward shape. The plate pieces are heated so that their temperature is gradually increased to 500° C. over 1.5 hours and kept at 500° C. for 1 hour. Then the furnace temperature is decreased to room temperature whereby the gaskets are completed (annealing process). If necessary grinding polishing, etc., may be performed to finally adjust the shapes of the gaskets.

Figure 2:
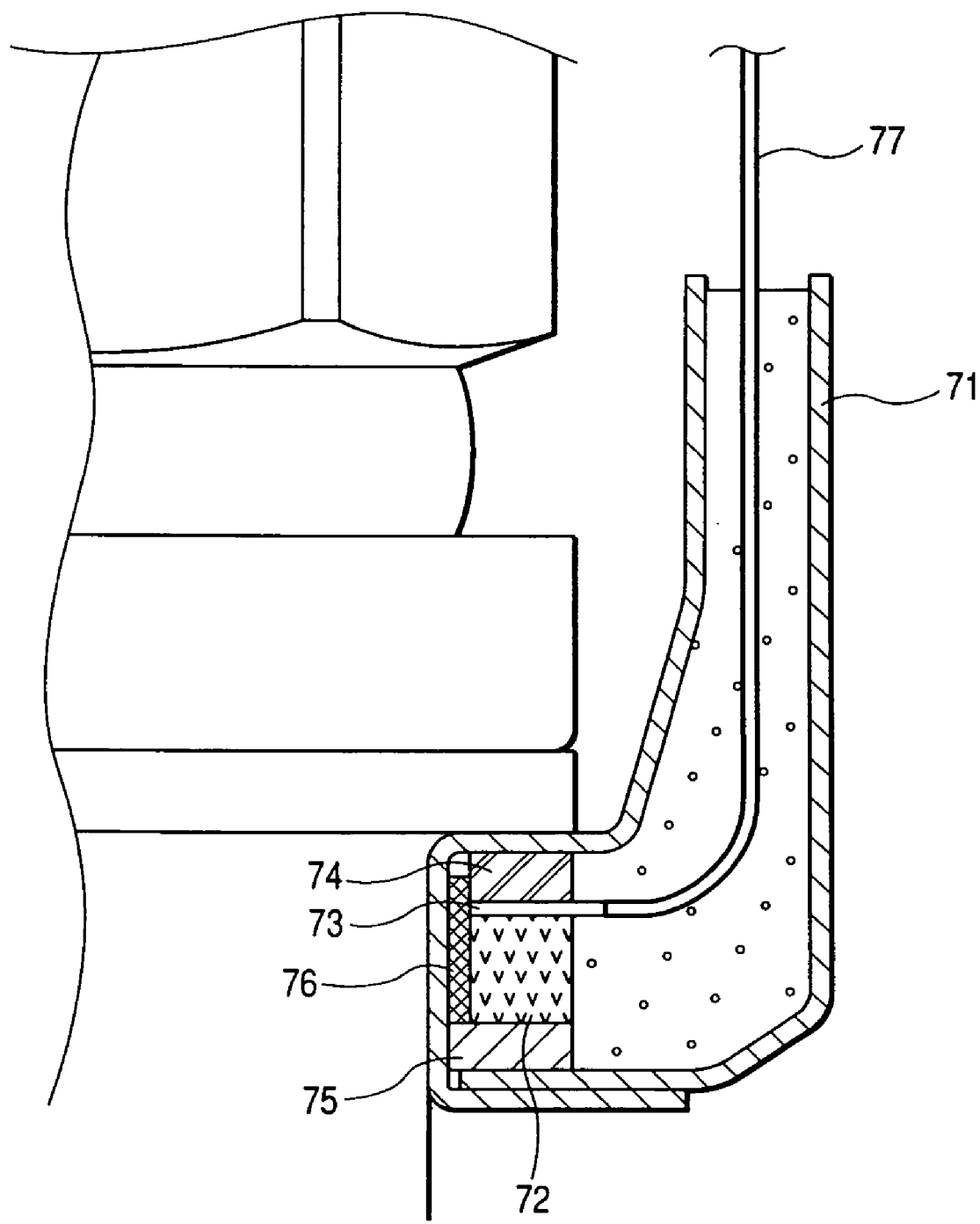
FIG. 2 is an enlarged view of a pressure sensor, the gasket, and neighboring members.

The configuration of the pressure sensor 70 will be outlined below in reference to FIG. 2. The case member 71 is made of stainless steel (e.g., SUS304) which has an annular bottom portion capable of accommodating an annular piezoelectric element 72 inside the bottom portion. An electrode plate 73 for taking out a combustion pressure signal and an insulating plate 74 made of alumina or the like for preventing short-circuiting between the electrode plate 73 and the case member 71 are disposed on the side of one end face (in FIG. 2, the top face) of the piezoelectric element 72, and the insulating plate 74 is in contact with the inner surface of the case member 71. On the other hand, a stainless steel annular seat 75 is disposed on the side of the other end face (in FIG. 2, the bottom face) of the piezoelectric element 72, and the annular seat 75 is in contact with the case member 71. As such, the piezoelectric element 72 is sandwiched between the two portions of the case member 71. The inner circumferential surface of the case member 71 is covered with a rubber insulating tube 76 so as not to contact and thereby avoid a short circuit with the electrode plate 73.

The pressure sensor 70 is attached to the spark plug 100 so as to be preloaded in the axial direction from outside the case member 71. When the preload is varied, a change occurs in the top and bottom faces of the piezoelectric element 72 and a sensor output is taken out by the electrode plate 73 and an output lead wire 77 which is connected to the electrode plate 73. Since the annular seat 75 and the case member 71 are made of conductive materials, they can assume the same potential as the engine head and hence an output lead wire need not be connected to the bottom face of the piezoelectric element 72. However, it goes without saying that the output may be taken out using an additional output lead wire.

The above-configured gasket 60 has a Young's modulus of 130 kN/mm$^2$. Therefore, owing to its large spring constant, the gasket 60 can transmit, to the pressure sensor 70, with high sensitivity, the lift distance (displacement) of the spark plug 100 which varies depending on the combustion pressure. A superior output characteristic can thus be obtained.

The gasket 60 has a 0.2% yield strength of 172 N/mm$^2$, which is lower than 250 N/mm$^2$. Therefore, by providing a relatively large true contact area, the gasket 60 can maintain good performance over a long period of time.

A description will now be made of tests which were conducted to confirm the advantages of the gasket 60. Table 1 shows the details of the gasket 60 according to the invention (Example) and gaskets as Comparative Examples. The gaskets of Example 1 of the invention and Comparative Examples 1 and 2 were produced by rolling an alloy material into a plate, punching the plate, and annealing resulting plate pieces; that is, they were produced in the same manner as in the invention but were made of a different material. For further comparison, for Comparative Examples 3 and 4, the following tests were also performed on gaskets having a different shape from Example 1 of the invention, i.e., an S-shaped cross section as used in ordinary spark plugs. Comparative Example 3 further differed from Example 1 of the invention in that spark plugs (M14) not provided with a pressure sensor for the combustion pressure detecting function were used. The male threads of the spark plugs that were used in the following tests had a nominal designation of M12. The dimensions of the completed gaskets were 1.5 mm in thickness, 12 mm in inner diameter, and 16.7 mm in outer diameter.

TABLE 1

| | Material composition (general name) | Young's modulus (kN/mm$^2$) | Post-annealing 0.2% yield strength (N/mm$^2$) |
|---|---|---|---|
| Example 1 | Ni: 1.00%, Sn: 0.90%, P: 0.05%, Cu: the other part (NB109) | 130 | 172 |
| Comparative Example 1 | Cu: 99% or more (tough pitch copper) | 118 | 39 |
| Comparative Example 2 | Sn: 1.00%, P: 0.50%, Cu: the other part (phosphor bronze) | 105 | 217 |
| Comparative Example 3 | Stainless steel (austenitic, SUS310) | 200 | 314 |
| Comparative Example 4 | Iron (cold-rolled steel plate) | 206 | 206 |

(Sensor Output Evaluation Test)

Figure 3:
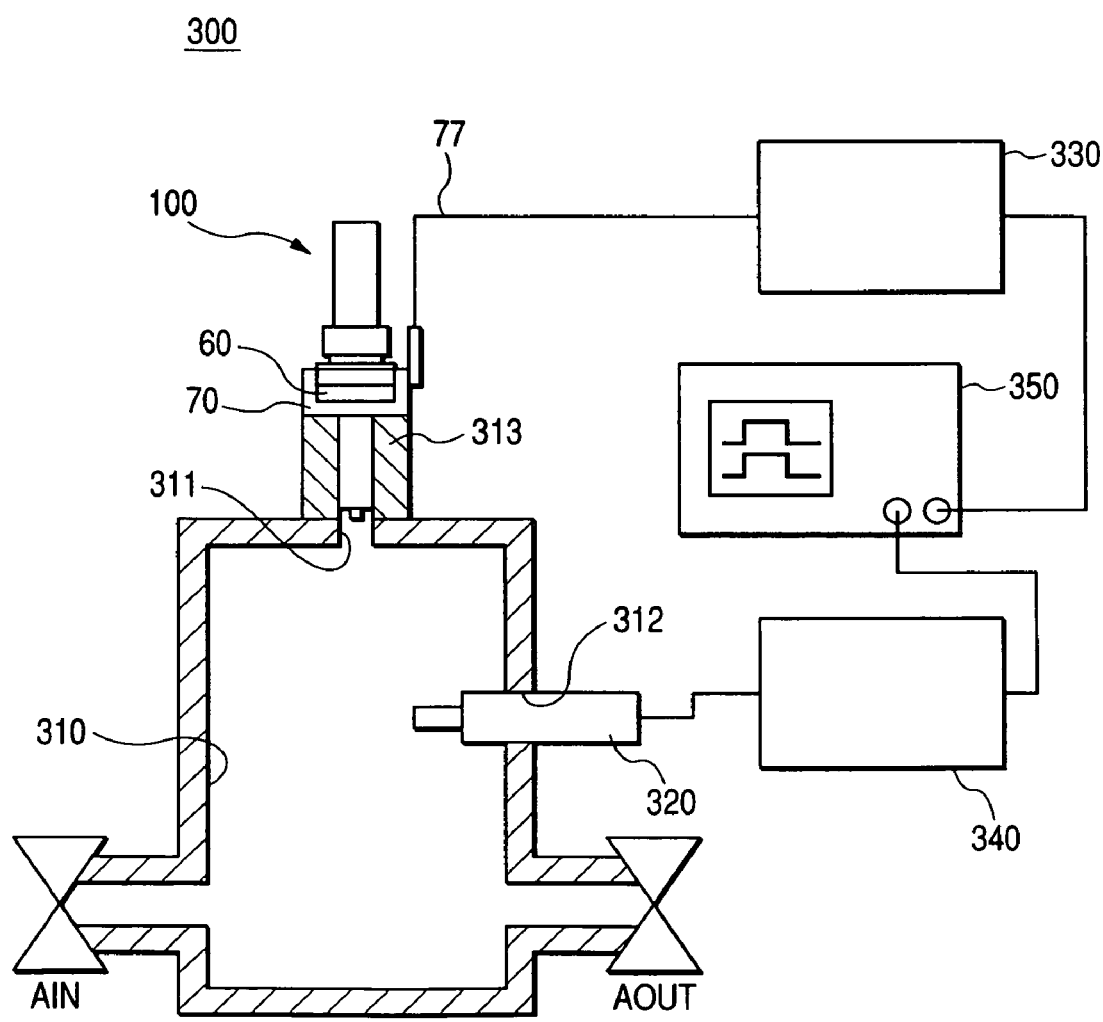
FIG. 3 shows a measuring system for conducting a sensor output evaluation test.

A sensor output evaluation test was conducted using measuring system 300 shown in FIG. 3. An air chamber 310 is equipped with an electromagnetic valve AIN for connection to a high-pressure air generating apparatus (not shown), an electromagnetic valve AOUT for connecting the air chamber 310 to the ambient atmosphere, a test measurement port 311, and a reference measurement port 312. The electromagnetic valve AIN and the electromagnetic valve AOUT are known air valves that are opened and closed by a solenoid. The electromagnetic valve AIN and the electromagnetic valve AOUT are closed to shut off air when not supplied with a voltage, and are opened to allow passage of air when supplied with a voltage.

An aluminum bushing 313 which is formed with a female thread having a nominal designation of M12 is attached to the test measurement port 311 of the air chamber 310. The air chamber 310 and the aluminum bushing 313 are connected to each other so as to establish an airtight state at the position where they are in contact with each other. Furthermore, only the threaded hole of the aluminum bushing 313 communicates with the inside and the outside of the air chamber 310. The spark plug 100 is attached to the aluminum bushing 313. The spark plug 100 is attached in such manner that the gasket 60 is brought into contact with the seat face 26 of the brim portion 25 at the position close to the rear end of the male thread 28 of the spark plug 100. Also, the pressure sensor 70 is preloaded so as to be sandwiched between the rear end face of the aluminum bushing 313 and the seat face 26 of the brim portion 25 via the gasket 60. The fastening torque for attaching the spark plug 100 is set at 17.5 N·m.

The output lead wire 77 of the pressure sensor 70 is connected to a charge amplifier 330 (type 5011, manufactured by Kistler Instrumente AG Winterthur, Switzerland) and an output of the charge amplifier 330 is input to an oscilloscope 350. A reference pressure sensor 320 (type 6052A, manufactured by Kistler Instrumente AG Winterthur, Switzerland) is attached to the reference measurement port 312 of the air chamber 310. An output of the reference pressure sensor 320 is input to a charge amplifier 340 (type 5011, manufactured by Kistler Instrumente AG Winterthur, Switzerland) and an output of the charge amplifier 340 is also input to the oscilloscope 350.

To start a measurement, the electromagnetic valve AIN is opened while the electromagnetic valve AOUT is closed, whereby air is introduced at 2 MPa for 0.3 sec. Then, the electromagnetic valve AIN is closed and the electromagnetic valve AOUT is opened, and the pressure in the air chamber 310 is returned to atmospheric pressure. This series of operations is performed in 1 sec or less. The series of operations is performed consecutively for several seconds and outputs of the charge amplifiers 330 and 340 are measured with the oscilloscope 350. Stabilized values of the outputs are employed as measurement values.

Figure 4:
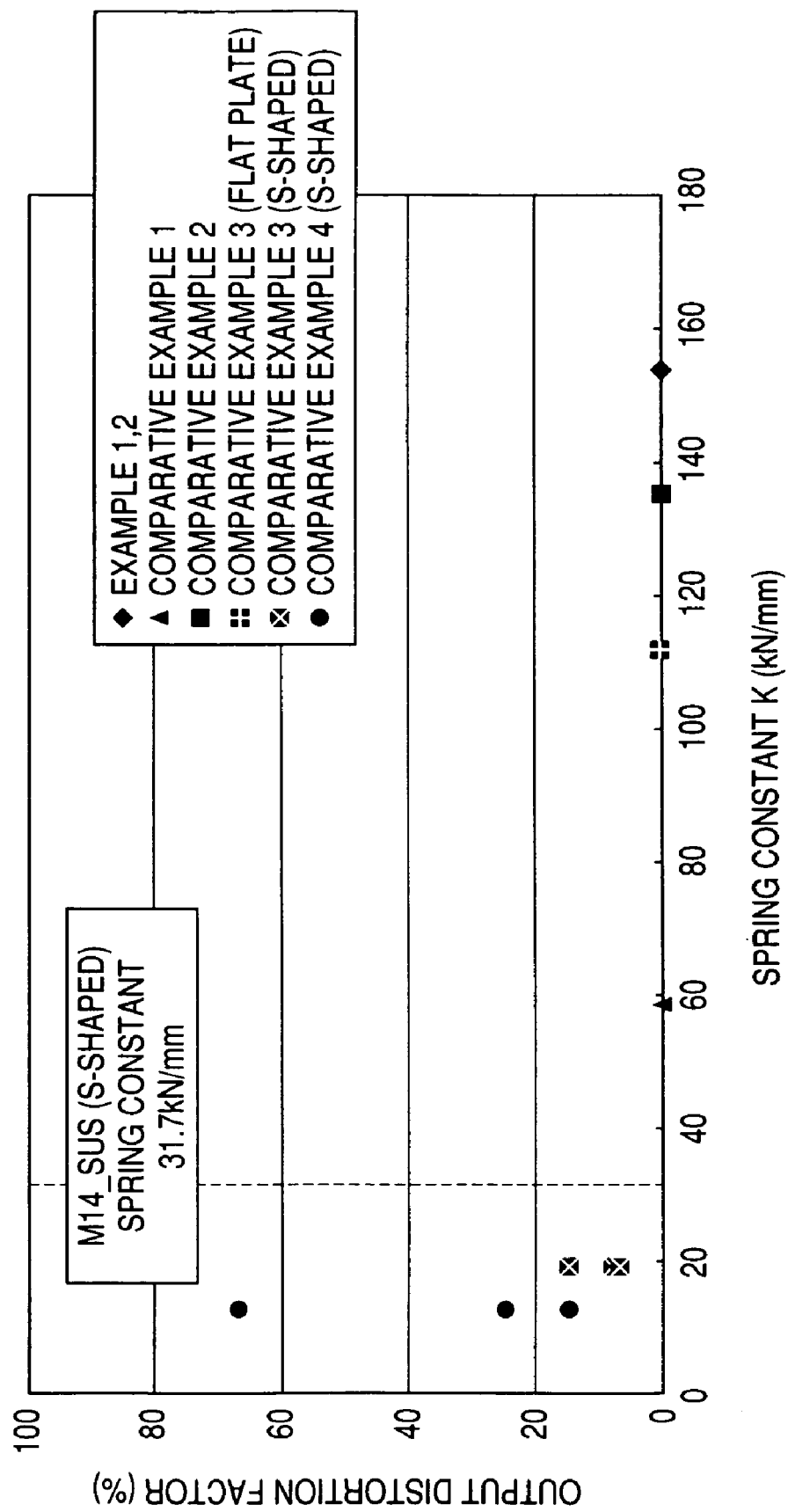
FIG. 4 is a graph showing a relationship between the spring constant and the output distortion factors of the pressure sensor obtained using the measuring system of FIG. 3.

A correlation between the output of the pressure sensor 70 and the output of the reference pressure sensor 320 was obtained. FIG. 4 shows calculated values of the output distortion factor which is defined as a reduction in the output of the pressure sensor 70 with the output of the reference pressure sensor 320 taken as 100%.

(Sealing Performance Evaluation Test)

Figure 5:
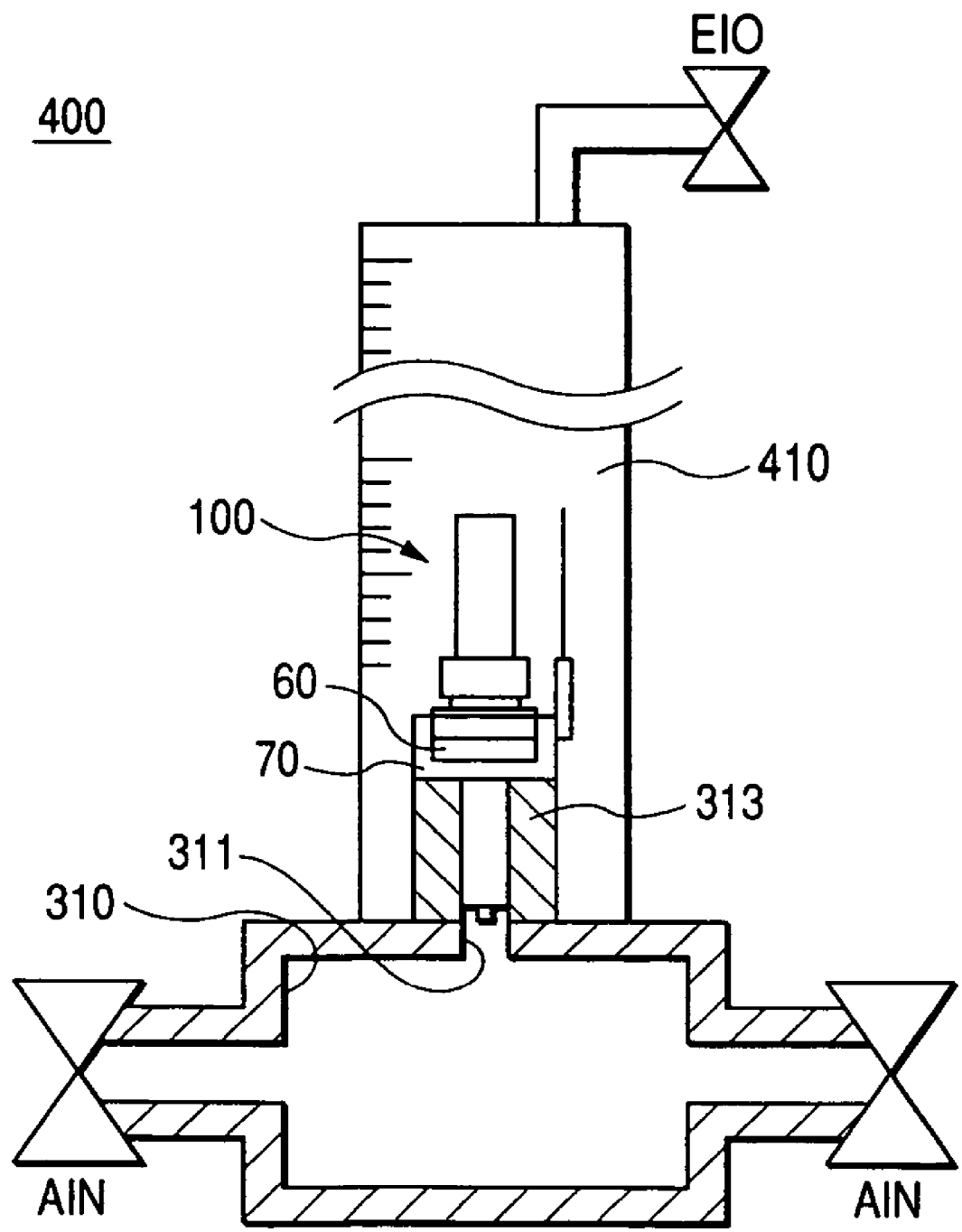
FIG. 5 shows a measuring system for conducting a sealing performance evaluation test.

To check the sealing performance which is the original performance of the gasket 60, an evaluation test was conducted using a measuring system 400 shown in FIG. 5. Most of the measuring system 400 has the same configuration as the measuring system 300 for the sensor output evaluation test. Components of the measuring system 400 having the same components as the measuring system 300 will be given the same reference symbols and will not be further described.

The air chamber 310 is equipped with the electromagnetic valve AIN and the test measurement port 311. As in the case of the measuring system 300 for the sensor output evaluation test, the aluminum bushing 131 is fixed to the test measurement port 311, and the spark plug 100 is attached to the aluminum bushing 131 via the gasket 60 and the pressure sensor 70. A leakage air measurement housing 410 is fixed so as to surround the spark plug 100 and the aluminum bushing 131. The inside of the measurement housing 410 is charged with a liquid (e.g., ethanol) and its top level is varied by air leakage. The amount of air leakage can thus be measured. To this end, the side surface of the air leakage measurement housing 410 has a scale similar to that of a measuring cylinder. The air leakage measurement housing 410 may be equipped with an electromagnetic valve EIO so as to enable introduction and removal of liquid and air as needed.

Figure 6:
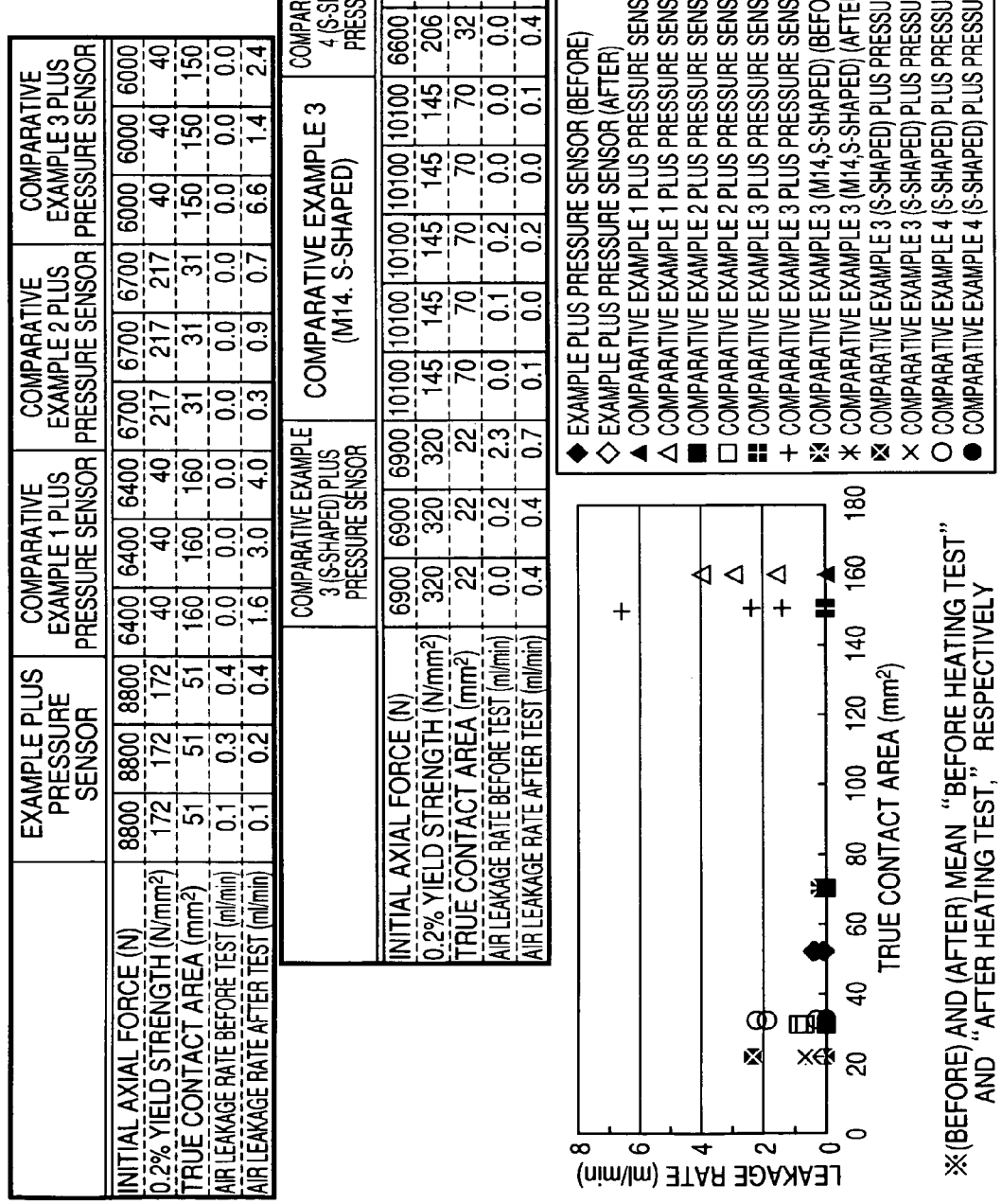
FIG. 6 is a graph showing a relationship between the true contact area and the air leakage rate obtained using the measuring system of FIG. 5.

Because the sealing performance depends on the true contact area of the gasket 60 (equation 2), the true contact area is calculated from the load on the gasket 60. The load on the gasket 60 can be measured using a load washer (type 9135AA, manufactured by Kistler Instrumente AG Winterthur, Switzerland; not shown) instead of the measuring system 400. True contact areas were calculated from measured loads and 0.2% yield strength values specific to the respective gaskets shown in Table 1. FIG. 6 is a graph in which the horizontal axis represents the true contact area and the vertical axis represents the air leakage rate.

FIG. 6 shows the results of a sealing performance evaluation test in which measurements were performed before and after a heated vibration test to simulate states before and after a run of a vehicle. In the heated vibration test, the spark plug 100 attached to the aluminum bushing 313 was placed in a thermostatic chamber and subjected to eight temperature cycles in which the temperature was increased in each from 50° C. to 200° C. over 1.5 hours, kept at 200° C. for 1 hour, and decreased to 50° C. over 1.5 hours. In the first four cycles, the spark plug 100 and the aluminum bushing 313 were vibrated in the axial direction of the spark plug 100 at an acceleration of 294 m/s (30 G) and 50 to 500 Hz in the thermostatic chamber. In the second four cycles, the spark plug 100 and the aluminum bushing 313 were vibrated perpendicularly to the axial direction under the same conditions. The term "initial axial force" means axial force acting on the gasket 60 when the spark plug 100 is attached to the aluminum bushing 313 with a prescribed torque.

The test results show that output distortion occurs and the output loss of the pressure sensor 70 is high when the spring constant is small. The evaluation test results show that the gasket 60 in the Example of the invention can fully transmit stress to the pressure sensor 70 without absorbing part of the stress even if the lift distance of the spark plug 100 is short. This is because the spring constant and hence the Young's modulus is large. It is also seen that the gasket 60 of the Example of the invention in the sealing performance test has a low air leakage rate and hence superior airtightness. This is because the Young's modulus is not too large, and the 0.2% yield strength is lower than 250 N/mm$^2$.

Further, the manner in which the surface roughness and the Vickers hardness of the gasket 60 influence the performance of the spark plug 100 having a combustion pressure detecting function was evaluated as follows.

(Surface Roughness Ry)

Figure 7:
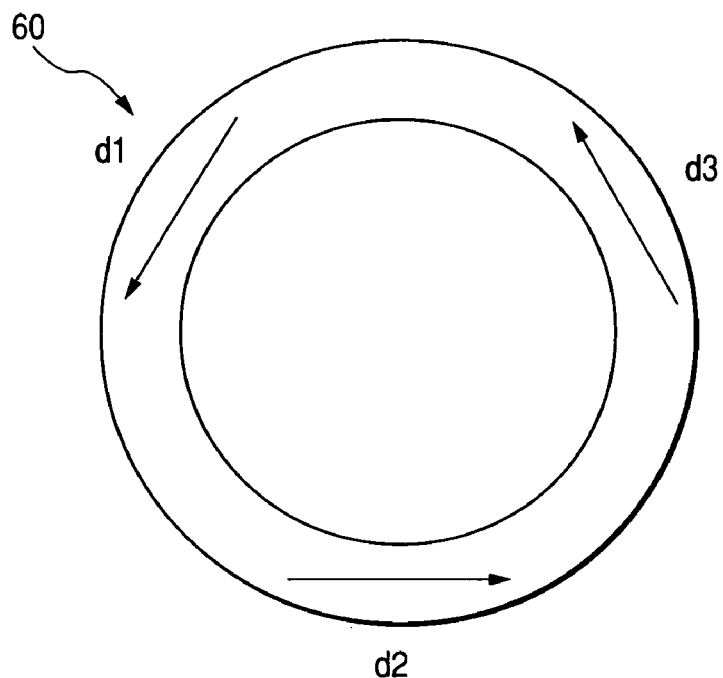
FIG. 7 is a top view illustrating surface roughness Ry measurement positions of each gasket.

Plural kinds of gasket samples having the same material composition (Ni: 1.00 wt %, Sn: 0.90 wt %, P: 0.05 wt %, Cu: balance) as the gasket of the above Example were prepared and subjected to grinding and polishing for different periods of time. Surface roughness values Ry of the gaskets thus processed were measured. As shown in Table 2, the gaskets had surface roughness values Ry of 0.5S, 1.6S, 3.0S, 3.2S and 10S. Spark plugs having a combustion pressure detecting function were constructed using the gaskets having the different surface roughness values Ry, and the influence of the surface roughness Rv on airtightness was evaluated the above measuring system 400 for the sealing performance evaluation test without conducting a heated vibration test to simulate an initial state after attaching to an engine. Each surface roughness value Ry was an average of values obtained by moving the stylus of a surface roughness meter along arrows d1, d2, and d3 (see FIG. 7). The gasket having a surface roughness Ry of 3.0S corresponds to the gasket of Example of the invention used in the above-described sensor output evaluation and sealing performance evaluation tests.

TABLE 2

| Surface roughness Ry | 0.5 S | 1.6 S | 3.0 S | 3.2 S | 10 S |
|---|---|---|---|---|---|
| Airtightness (air leakage rate (ml/min)) | OK (lower than 1) | OK (lower than 1) | OK (lower than 1) | OK (lower than 1) | NG (50 to 100) |

The gaskets having the surface roughness values Ry of 0.5S, 1.6S, 3.0S and 3.2S exhibited air leakage rates of 0 or on the order of 0.1 ml/min, and hence had high airtightness (indicated by "OK"). On the other hand, those gasket samples having a surface roughness Ry of 10S exhibited air leakage rates of 50 to 100 ml/min and hence were judged to have relatively low airtightness (judged "NG"). The test results show that airtightness tends to increase as the surface roughness value Ry decreases. However, making the surface excessively smooth increases the number of manufacturing steps and increases the manufacturing cost. From this point of view, the inventors consider the performance of the gasket 60 to be satisfactory if the surface roughness value Ry is larger than the large limitations of about 3.0S.

Figure 8A:
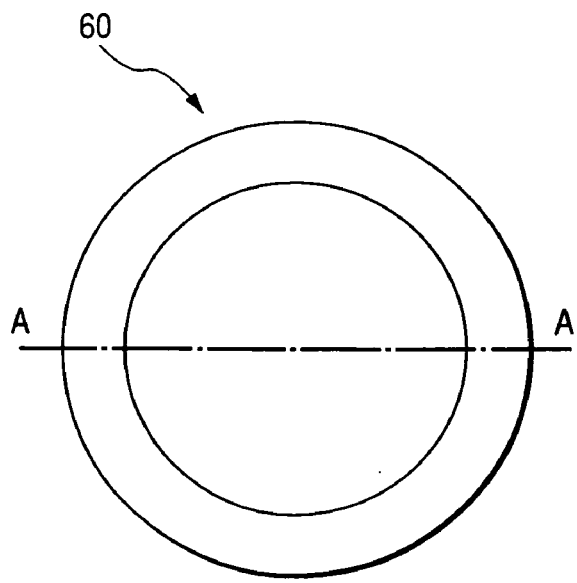
FIGS. 8A and 8B are a top view and a sectional view, taken along line A-A of FIG. 8A, respectively, illustrating Vickers hardness measurement positions of each gasket.
Figure 8B:
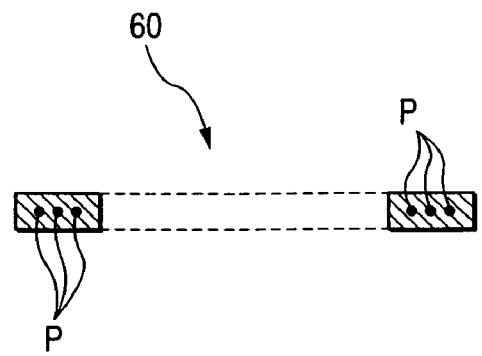

The influence of Vickers hardness on the output and airtightness was also evaluated. Gasket test samples were formed having the same material composition as in the above test (Ni: 1.00 wt %, Sn: 0.90 wt %, P: 0.05 wt %, Cu: balance). Plural kinds of gaskets having different Vickers hardness values were formed by employing various annealing conditions. As a result, gaskets having Vickers hardness values Hv of 60, 70, 85, 90 and 110 were obtained as shown in Table 3. Spark plugs having a combustion pressure detecting function were constructed using the gaskets having the different Vickers hardness values. The sensor output was measured using the measuring system 300 as in the above sensor output test, and the influence of the Vickers hardness on the airtightness was determined using the measuring system 400 as in the above sealing performance evaluation test to simulate an initial state after attaching to an engine. Each Vickers hardness value was an average of values obtained by exposing, through polishing, cross sections taken along line A-A passing through the center of each gasket (see FIG. 8A) and measuring hardness values at three points P on each cross section (see FIG. 8B) using a Vickers hardness tester. All of the above-described sensor output test, sealing performance test and test for checking the influence of the surface roughness Ry on the airtightness were conducted using gasket samples having a Vickers hardness Hv of 85.

TABLE 3

| Vickers hardness Hv | 60 | 70 | 85 | 90 | 110 |
|---|---|---|---|---|---|
| Sensor outout | 90% | 100% | 100% | 100% | 100% |
| Airtightness (air leakage rate (ml/min)) | OK (lower than 1) | OK (lower than 1) | OK (lower than 1) | OK (lower than 1) | NG (30 to 100) |

When the output value in the above-described sensor output test with the Vickers hardness Hv of 85 was taken as 100%, output values obtained with Vickers hardness values Hv of 70, 90 and 110 were approximately the same (100%) as obtained in the above-described sensor output test. On the other hand, output values obtained with a Vickers hardness value Hv of 60 were slightly smaller (91%). Air leakage rates obtained with the Vickers hardness values Hv of 60, 70, 85, and 90 were 0 or on the order of 0.1 ml/min and hence were judged "OK." On the other hand, air leakage rates obtained with the Vickers hardness value Hv of 110 were 30 to 100 ml/min and hence judged to be relatively high judged "NG"). These results show that a satisfactory sensor output is obtained if the Vickers hardness value Hv is larger than or equal to 60. However, since a slight output reduction was found with the Vickers hardness value Hv of 60, the Vickers hardness value Hv more desirably is larger than or equal to 70. On the other hand, since the air leakage rates obtained with the Vickers hardness value Hv of 110 were higher than with the other Vickers hardness values, as far as airtightness is concerned, the Vickers hardness value Hv is desirably smaller than or equal to 90.

As described above, the various evaluation tests were performed on the gasket samples including those of the Example of the invention. In these tests, the gasket was attached so as to contact seat face 26 of the brim portion 25 of the metal shell 20. However, the invention is not limited to such an arrangement. For example, the positions of the gasket 60 and the pressure sensor 70 may be interchanged. That is, no problems arise even if the pressure sensor 70 is sandwiched between the gasket 60 and the seat face 26.

It should further be apparent to those skilled in the art that various changes in form and detail of the invention as shown and described above may be made. It is intended that such changes be included within the spirit and scope of the claims appended thereto.

This application is based on Japanese Patent application JP 2005-104737, filed Mar. 31, 2005, the entire content of which is hereby incorporated by reference, the same as if set forth at length.

What is claimed is:

1. A spark plug, comprising:
    a center electrode;
    a ground electrode facing the center electrode so that a spark gap is formed at a tip end portion in an axial direction of the spark plug;
    a metal shell including a male thread adapted for attaching the spark plug to an internal combustion engine and a brim portion provided at a rear end side of the male thread and projecting perpendicularly to the axial direction; and
    an annular gasket provided on a tip side of the brim portion, said gasket comprising a copper alloy containing Ni, Sn, and P
    wherein the gasket has a Young's modulus E (kN/mm$^2$) satisfying a relationship $100 \leq E \leq 170$.

2. The spark plug as claimed in claim 1, wherein the gasket has a 0.2% yield strength of 250 N/mm$^2$ or less.

3. The spark plug as claimed in claim 1, wherein the gasket has a surface roughness Ry of 3.2S or less.

4. The spark plug as claimed in claim 1, wherein the gasket has a Vickers hardness Hv of from 60 to 90.

5. The spark plug as claimed in claim 1, wherein the gasket has a Vickers hardness Hv of from 70 to 90.

6. The spark plug as claimed in claim 1, wherein the gasket comprises a copper alloy containing from 0.80 to 1.20 wt % of Ni, from 0.50 to 1.10 wt % of Sn, from 0.03 to 0.07 wt % of P, and from 97.63 to 98.67 wt % of Cu.

7. The spark plug as claimed in claim 1, wherein the spark plug has a combustion pressure detecting function, and the spark plug further comprises a pressure sensor including a pressure-sensitive element.

8. The spark plug as claimed in claim 1, wherein the gasket is flat.

9. A spark plug, comprising:
    a center electrode;
    a ground electrode facing the center electrode so that a spark gap is formed at a tip end portion in an axial direction of the spark plug;
    a metal shell including a male thread adapted for attaching the spark plug to an internal combustion engine and a brim portion provided at a rear end side of the male thread and projecting perpendicularly to the axial direction; and
    an annular, gasket provided on a tip side of the brim portion,
    wherein the gasket comprises a copper alloy containing from 0.80 to 1.20 wt % of Ni, from 0.50 to 1.10 wt % of Sn, from 0.03 to 0.07 wt % of P, and from 97.63 to 98.67 wt % of Cu.

10. The spark plug as claimed in claim 9, wherein the spark plug has a combustion pressure detecting function, and the spark plug further comprises a pressure sensor including a pressure-sensitive element.

11. The spark plug as claimed in claim 9, wherein the gasket is flat.

* * * * *